UNITED STATES PATENT OFFICE.

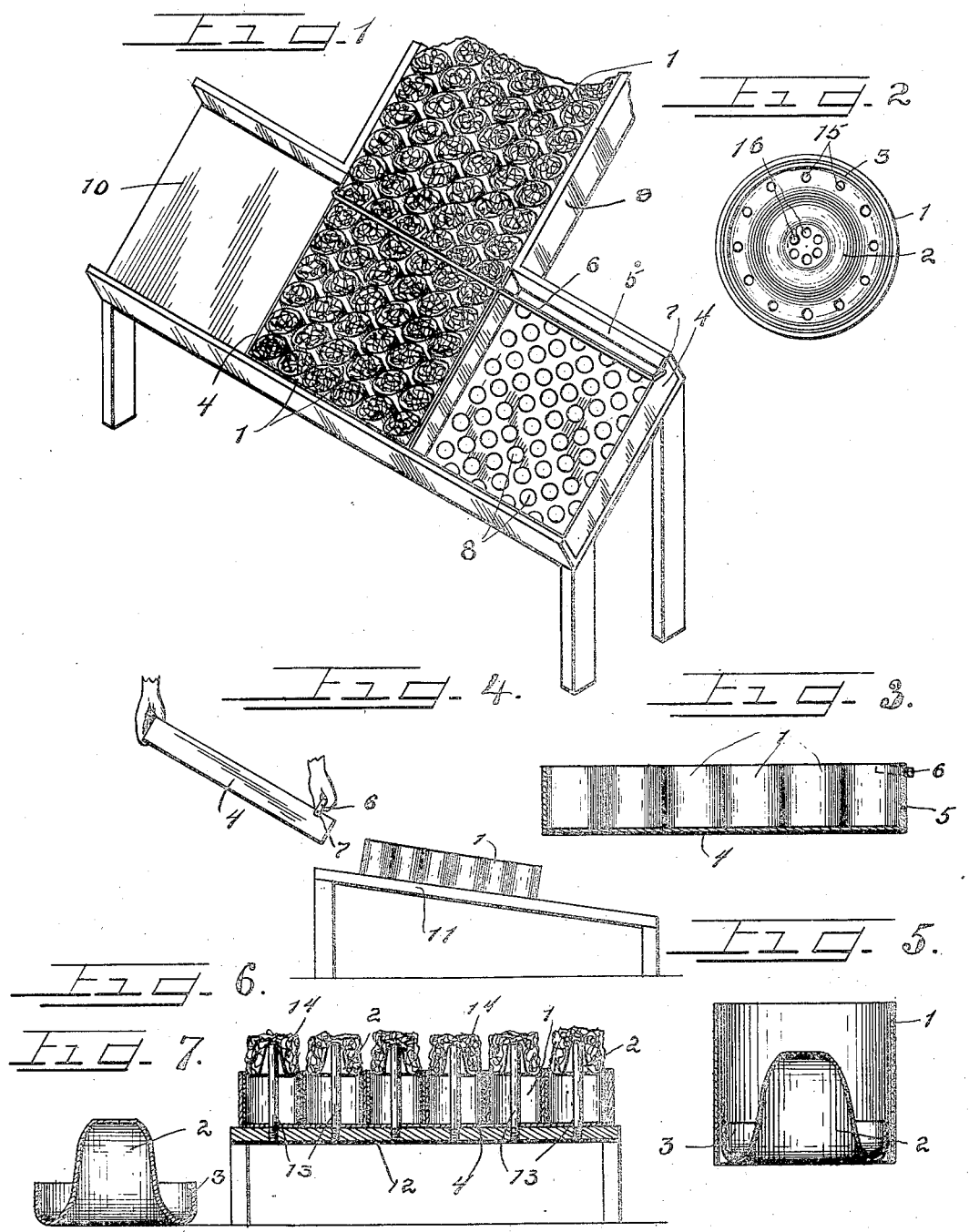

WILLIAM ERASTUS WILLIAMS, OF CHICAGO, ILLINOIS.

BISCUIT-BAKING APPLIANCE.

No. 896,964.     Specification of Letters Patent.     Patented Aug. 25, 1908.

Application filed June 30, 1905. Serial No. 267,788.

*To all whom it may concern:*

Be it known that I, WILLIAM ERASTUS WILLIAMS, a citizen of the United States, residing at Chicago, county of Cook, State of Illinois, have invented a new and useful Improvement in Biscuit-Baking Appliances, of which the following is a specification.

The object of the invention is to provide convenient devices for use in the commercial manufacture of biscuits and particularly of biscuits of shredded cereals having a cup-like form. In making such biscuits, it has been a very difficult matter to form a cup-like mass that is neither too loose in texture nor too compact and that is not crushed down at any point but is uniformly light and open throughout. Obviously a slight pressure upon soft uncooked filaments destroys this practically indispensable characteristic. So when the material has been cooked it is very fragile and it has been very difficult to remove it from the cup in which it is baked without injuring its filaments. To avoid these difficulties and provide for charging and discharging the cups perfectly, rapidly and certainly are among the more specific objects of the invention. The desired ends are attained by providing novel cups to be used in a set in a novel pan.

In the accompanying drawings, Figure 1 is a perspective view illustrating the manner of using the novel cups and pans, preparatory to putting the same in the oven. Fig. 2 is a plan view of one of the baking cups. Fig. 3 is a vertical section of a baking pan filled with such cups. Fig. 4 illustrates the manner of using the novel pan when the cups are all to be removed bodily therefrom. Fig. 5 is a vertical section of one of the baking cups. Fig. 6 shows the method of removing the baked product from a set of the cups by taking advantage of their peculiar construction. Fig. 7 is a vertical section of the removable bottom of one of the baking cups.

The tables and special devices for using the pans and cups are without novelty herein claimed and are shown only to make clear the nature and objects of the invention.

In these figures, 1 represents the cylindrical body of a metal baking cup and 2 a bottom for the cup, made to slide easily into and out of the same and having the form of an inverted cup provided with central perforations 16 and also perforations 15 in its upwardly curved flange 3, of approximately semicircular cross-section. The highest part of the bottom is materially below the plane of the upper edge of the body, so that when the cup is filled the material takes a cup-like form and is not a mass having a central opening. When these cups are filled they are placed in pans 4 adapted to hold somewhat closely a definite number. Each pan lacks one side wall, so that a set of cups may slide together into and out of the pan, and is provided with a bail 6 pivoted to the sides of the pan at some distance from its open side in position to swing down into the plane of the missing side and obstruct the movement of the cups, and to swing upward when desired, above the plane of the cups which may slide in beneath it in filling the pan, and to serve also as a handle when the cups are to slide out of the pan, these uses being illustrated in Figs. 1 and 4. When a set of cups is secured in the pan, each occupies a fixed position, and centrally beneath each is an aperture 8, and thereby the pan may be pressed down upon a set of pins (Fig. 6), which thus raise the loose bottoms simultaneously lifting the biscuits out of the bodies of the cups and holding them in position for conveniently removing the baked product. The perforations in the loose bottoms not only allow circulation of air but permit drawing the filaments into the cup by atmospheric suction, which is necessary if they are to be evenly and compactly distributed without crushing.

What I claim is: -

1. A baking cup having an upwardly removable bottom projecting upward, centrally, to form an inverted cup of materially less height than the lateral walls, and provided with a series of central perforations and a series of perforations near its margin.

2. The combination with a baking pan provided with a series of perforations in its bottom, of a set of baking cups having upwardly removable bottoms registering with said perforations, respectively.

WILLIAM ERASTUS WILLIAMS.

Witnesses:
   W. A. SHEAHAN,
   W. F. DUNHAM.